United States Patent [19]
Rodgers et al.

[11] Patent Number: 5,313,928
[45] Date of Patent: May 24, 1994

[54] PORTABLE CAMP STOVE AND BARBECUE GRILL

[75] Inventors: Aubrey Rodgers, Surrey; Kenneth P. Hope; Norman B. Hope, both of Princeton, all of Canada

[73] Assignee: Firelight Leisure Products Ltd., Princeton, Canada

[21] Appl. No.: 895,362

[22] Filed: Jun. 9, 1992

Related U.S. Application Data

[63] Continuation-in-part of Ser. No. 348,461, May 4, 1989, Pat. No. Des. 326,792, which is a continuation-in-part of Ser. No. 892,806, Jun. 8, 1992, abandoned, which is a continuation-in-part of Ser. No. 823,002, Jan. 13, 1992, abandoned, which is a continuation of Ser. No. 378,998, Jul. 12, 1989, abandoned.

[51] Int. Cl.⁵ .............................................. F24C 5/20
[52] U.S. Cl. .................................. 126/38; 126/41 R; 126/201; 99/447; 99/449
[58] Field of Search .................... 99/339, 447–450; 126/9 R, 38, 41 R, 83, 201, 304 R, 305

[56] References Cited

U.S. PATENT DOCUMENTS

| Re. 24,296 | 3/1957 | Stewart . | |
|---|---|---|---|
| D. 234,286 | 2/1975 | MaKenny et al. . | |
| D. 294,217 | 2/1988 | Haglund | D7/362 |
| D. 326,792 | 6/1992 | Rodgers et al. | D7/337 |
| 739,543 | 9/1903 | Hamer . | |
| 2,742,893 | 4/1956 | Keffer | 126/38 |
| 3,398,734 | 8/1968 | Mejyr | 126/38 |
| 3,559,663 | 2/1971 | Every et al. . | |
| 3,611,912 | 10/1971 | Choc | 99/339 |
| 3,638,634 | 2/1972 | Bolitho | 126/41 R |
| 3,664,322 | 5/1972 | Clark | 126/25 A |
| 3,753,431 | 8/1973 | Koziol | 126/38 |
| 3,789,821 | 2/1974 | Fick et al. | 126/38 |
| 3,976,046 | 8/1976 | Morton et al. | 126/9 R |
| 4,046,132 | 9/1977 | White | 126/9 R |
| 4,133,335 | 1/1979 | Malafouris | 126/9 R |
| 4,158,992 | 6/1979 | Malafouris | 99/421 HV |
| 4,268,741 | 5/1981 | O'Brien . | |
| 4,403,597 | 9/1983 | Miller | 126/41 R |
| 4,416,249 | 11/1983 | Reynolds et al. | 126/41 R |
| 4,418,678 | 12/1983 | Erickson | 126/9 R |
| 4,442,824 | 4/1984 | Amici . | |
| 4,446,846 | 5/1984 | Hahn | 126/25 R |
| 4,524,751 | 6/1985 | Hoglund | 126/25 A |
| 4,587,948 | 5/1986 | Haglund | 126/38 |
| 4,696,282 | 9/1987 | Incitti | 126/9 R |
| 4,741,321 | 5/1988 | Squires | 126/9 R |
| 4,884,499 | 12/1989 | Rensch et al. | 99/449 |

FOREIGN PATENT DOCUMENTS

| 59362 | 2/1975 | Australia . |
| 1135138 | 11/1982 | Canada . |
| 1221286 | 5/1987 | Canada . |
| 2574164 | 12/1984 | France . |
| 627760 | 8/1949 | United Kingdom . |

OTHER PUBLICATIONS

H&H Surplus Catalogue #5 1965–1966 p. 23 Coleman New Improved Camp Stove.

Primary Examiner—Harvey C. Hornsby
Assistant Examiner—Mark Spisich
Attorney, Agent, or Firm—Pollock, Vande Sande & Priddy

[57] ABSTRACT

The present invention provides a portable camp stove and barbecue grill which includes both a propane-fueled barbecue grill and a propane-fueled camp stove within the same unit. The unit stores compactly within its own case for ease of transportation and opens to cooking positions whereby both barbecue grill and camp stove sections can be used simultaneously. A metal smoker plate is substituted for lava rock in the barbecue section to facilitate compact storage, and a storable heat shield is provided which in its operating position underlies the barbecue section to keep the supporting surface cool.

20 Claims, 10 Drawing Sheets

FIG. I

PORTABLE CAMP STOVE AND BARBECUE GRILL

RELATED APPLICATIONS

This application is a continuation-in-part of application Ser. No. 07/348,461 filed May 4, 1989, now U.S. Pat. No. Des. 326,792, which is a continuation-in-part of application Ser. No. 07/892,806 filed Jun. 8, 1992, now abandoned, which was a continuation-in-part of application Ser. No. 07/823,002 filed Jan. 13, 1992, now abandoned, which was a continuation of application Ser. No. 07/378,998 filed Jul. 12, 1989, now abandoned. The entire contents of these earlier applications are incorporated herein by reference.

TECHNICAL FIELD

This invention relates to portable cooking devices and more particularly to a portable gas-fired cooking device which combines a propane barbecue grill and a propane camp stove in a single unit.

BACKGROUND OF THE INVENTION

Previously, portable gas-fired cooking devices have generally been one of two types, a barbecue grill of the type in which the gas element heats the food indirectly by utilizing briquettes known as "lava rock" to absorb and radiate heat to the food, or a camp stove in which the gas element heats the food on the stove directly in a frying pan or the like. Each type of cooking device has its own advantages and drawbacks. The former type of device is more suitable for the barbecuing of meats as it allows fat from the meat to drop onto the lava rock where it is burned off, adding flavor to the cooked meat without making the cleaning of the cooking device overly difficult. However the lava rock barbecues are slow to heat and cannot concentrate the heat on a small area and so are not particularly efficient for boiling water for coffee or the like. Also the presence of the lava rock makes this type of device less desirable for carrying on a camping trip.

The latter type of device, the camp stove having one or more gas-fired burners adjacent the grill, is efficient for concentrating heat on a coffee pot or frying pan. Such stoves cannot, however, serve to usefully barbecue meats.

Various attempts have been made to combine the advantages of the portable gas-fired barbecue with the portable gas-fired camp stove in one unit. For example Canadian patent no. 1,221,286 issued May 5, 1987 to Camper Delight Sales Corp. discloses a portable cooking device which includes both a camp stove and a gas-fired barbecue in one portable unit. In this device, the housing has two concave cooking sections hinged together, one of the cooking sections housing a gas-fired cooking element for a camp stove, and the other section containing a gas-fired barbecue. The barbecue section consists of a curved heat reflector dish which is spaced from the sides of the walls of the barbecue by a heat deflector plate, a gas-fired burner tube located centrally within the reflective dish, flame shields above and below the burner tube, and a support frame for supporting lava rocks above the burner. The stove section also has a heat reflector pan under the dual elements. This design is too heavy and bulky too be practical as a portable camp stove.

U.S. Pat. No. 4,446,846 issued May 8, 1984 to Columbia Industries Corp. discloses another combination camp stove and barbecue in which two grate modules are provided so that the barbecue and stove operations can be conducted simultaneously side by side. This design also incorporates lava rocks and so shares the same disadvantages as lava rock barbecues in respect of bulkiness and lack of portability, and further has restricted space for cooking due to the division of the sole cooking area.

There is therefore a need for a compact and convenient portable camp stove design which incorporates both a gas-fired barbecue and a standard camp stove.

SUMMARY OF THE INVENTION

The present invention provides a combination portable camp stove and barbecue grill comprising both a propane-fueled barbecue grill and a propane-fueled camp stove mounted in the opposing halves of the case of the same unit. The unit stores compactly in its own case for ease of transportation and opens to the cooking position whereby both the barbecue grill and camp stove sections can be used simultaneously. A metal smoker plate is substituted for lava rock in the barbecue section to facilitate compact storage, and a storable heat shield is provided which in its operating position underlies the barbecue section to keep the supporting surface cool.

BRIEF DESCRIPTION OF THE DRAWINGS

In drawings which illustrate a preferred embodiment of the invention.

DETAILED DESCRIPTION OF A PREFERRED EMBODIMENT

Figure 1:
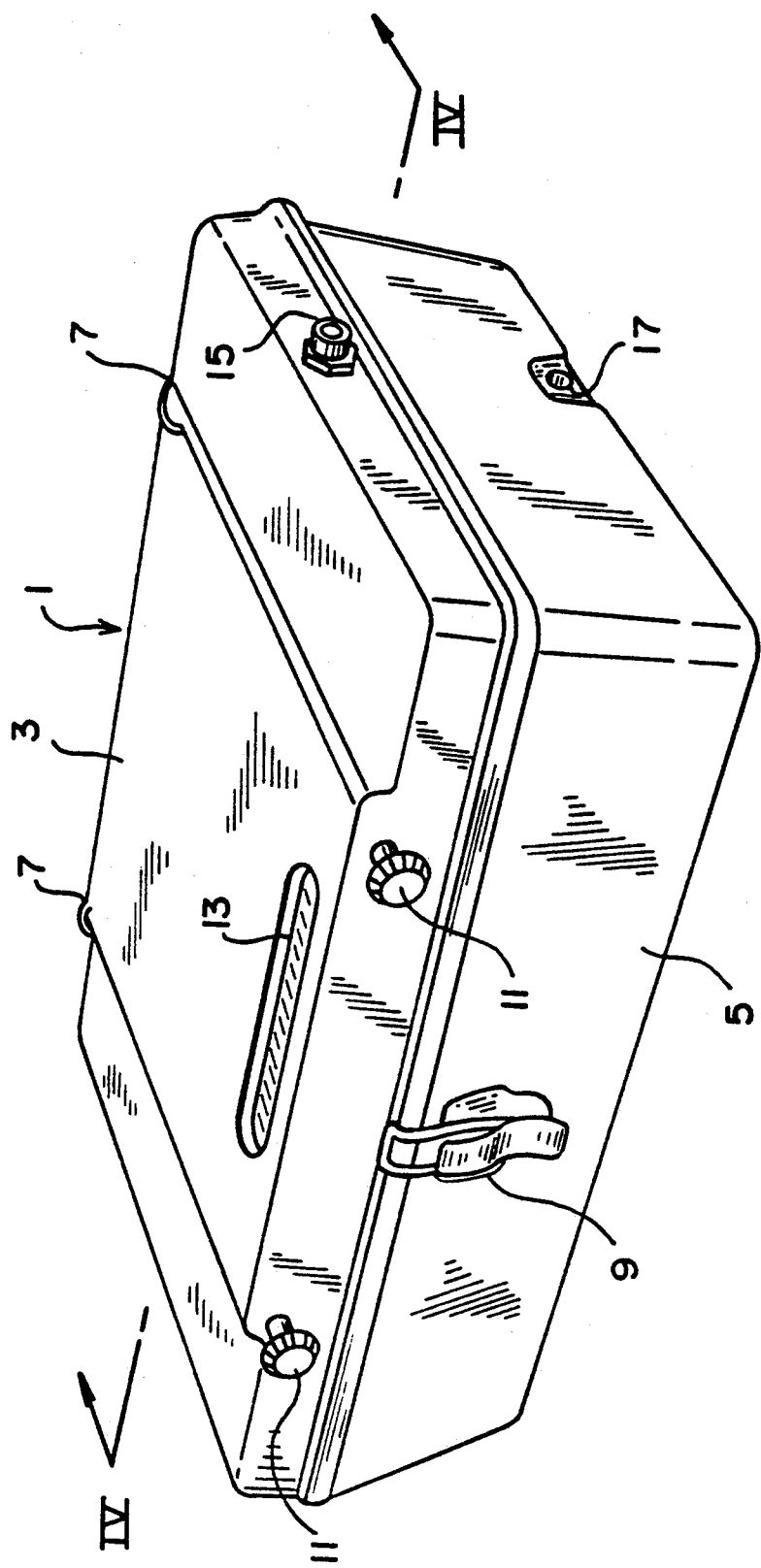
FIG. 1 is a perspective view of the invention in closed position.
Figure 2:
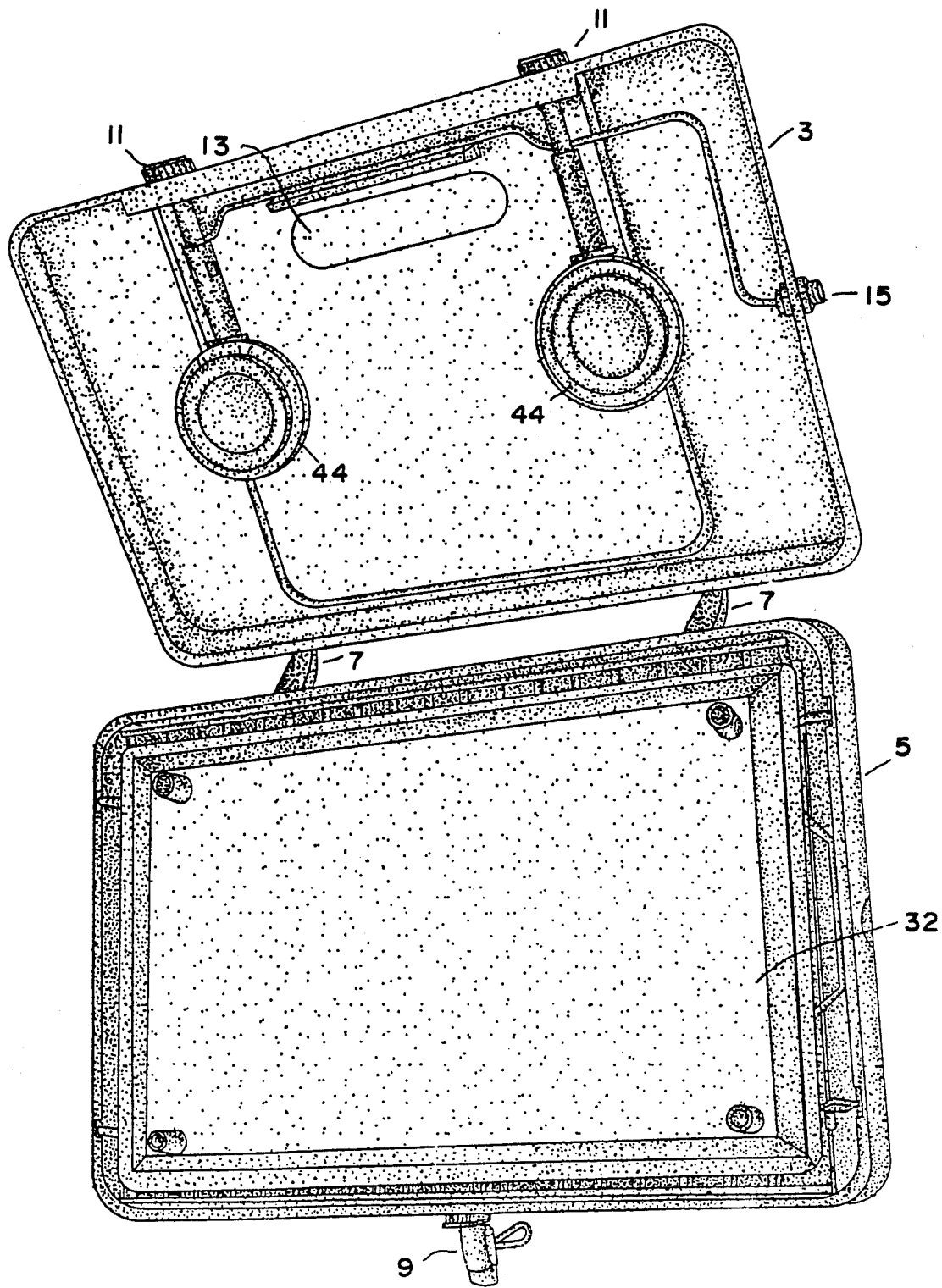
FIG. 2 is a perspective view of the invention shown in FIG. 1 with the cover open.

With reference to FIGS. 1 and 2, the camp stove of the invention, designated generally as 1, has a top stove section 3 and a bottom barbecue section 5 which are connected by hinges 7. Top Section 3 serves as a lid secured in the closed position by latch 9. Stove element control knobs 11 are provided and a recess 13 functions as a carrying handle for the unit. Gas inlet 15 is provided for the stove heating elements and gas inlet 17 serves the barbecue heating element.

Figure 4:
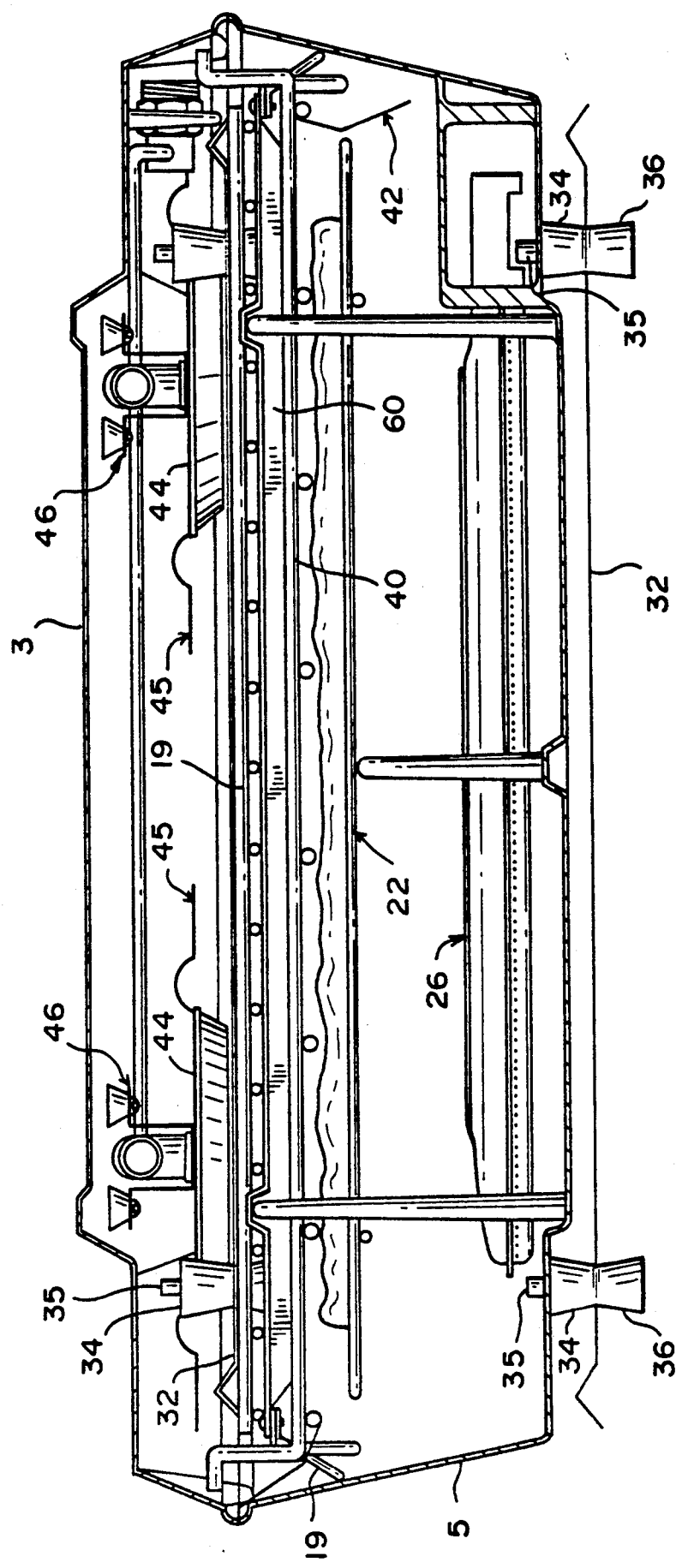
FIG. 4 is a cross-sectional view taken along lines IV—IV of FIG. 1.
Figure 5:
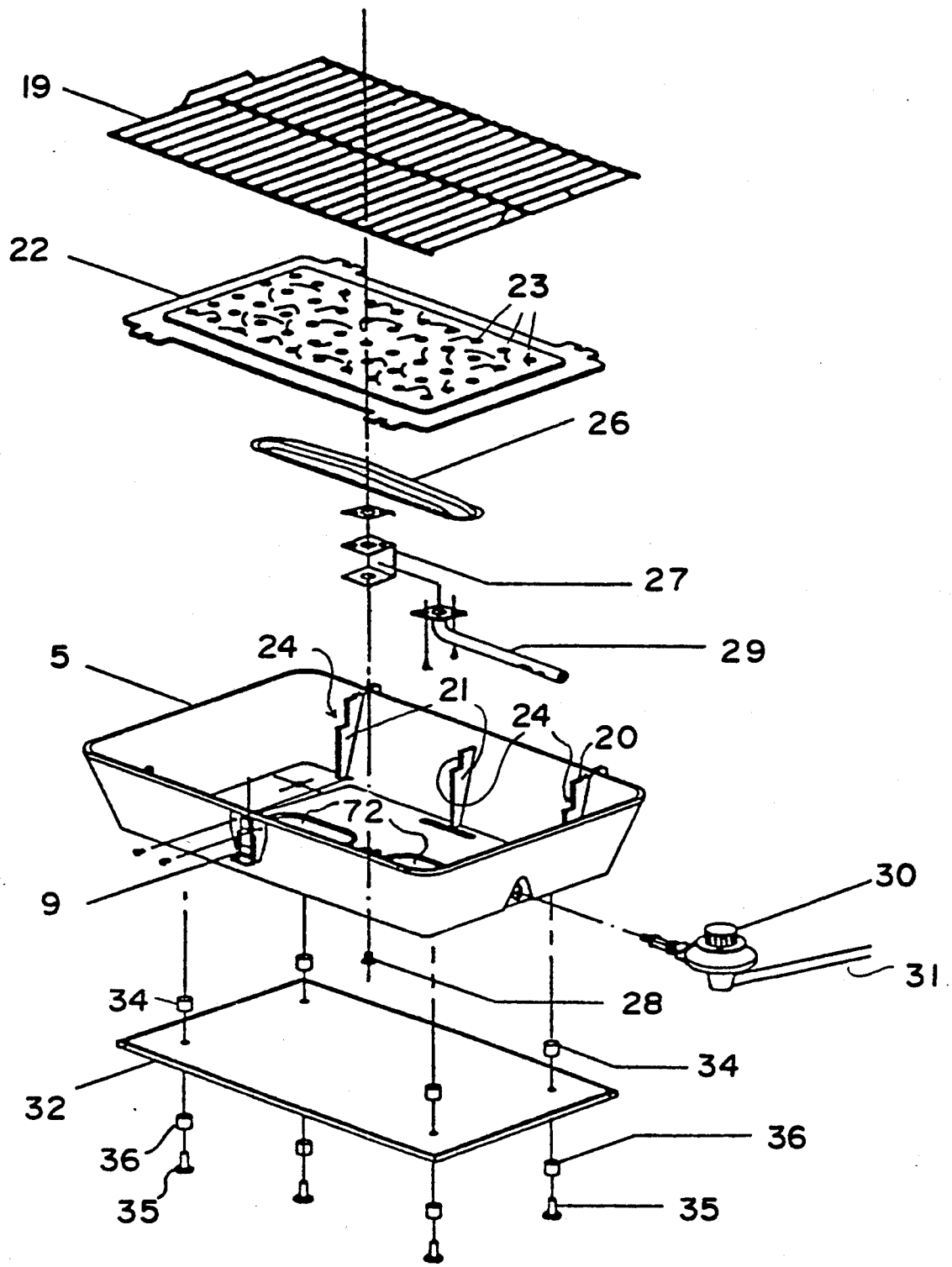
FIG. 5 is an exploded view of the barbecue section of the invention shown in FIG. 1.

Looking at FIGS. 4 and 5, the barbecue section of the device has a grate 19 which sits on shoulders 20 of flanges 21. A cast iron smoker plate 22, provided with a number of holes 23 for circulation of air, sits on shoulders 24. Smoker plate 22 permits the transfer of heat from the barbecue heating element to the overlying grate, while catching and "smoking" drippings from the food being cooked. Burner 26 is connected to the bottom section 5 by bracket 27 and bracket screw 28 and is provide with a supply of propane gas through burner tube 29. The gas supply from the propane source through hose 31 is regulated by regulator 30. Heat shield 32 is provided with upper and lower insulator legs 34 and 36, respectively, which are secured by screws 35 and are made from a synthetic resin such as BAKELITE. Screws 35 extend through the upper end of legs 34 to be inserted into apertures in the underside of bottom section 5 when the barbecue unit is seated on the heat shield.

Figure 6:
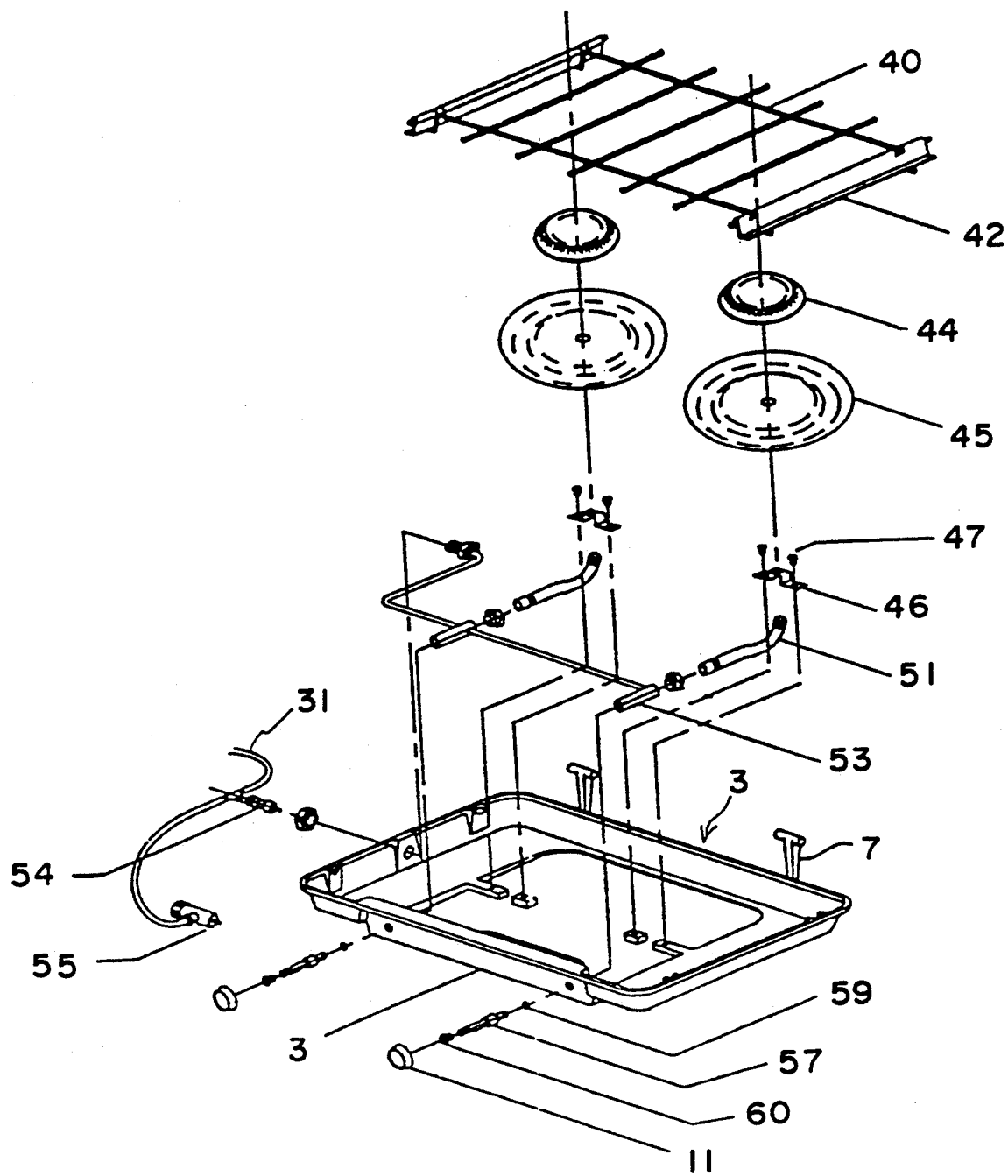
FIG. 6 is an exploded view of the camp stove section of the invention shown in FIG. 1.

With reference to FIGS. 4 and 6, the camp stove section of the unit has a grate 40 with attached wind screens 42, two burner heads 44 and related reflector disks 45 which are secured to the top lid 3 by brackets 46 and screws 47. Propane gas is supplied to the burner heads in the usual way via burner tubes 51, manifold 53, hose 54, regulator 55, control knobs 11, needle valves 57, 0-rings 59 and lock nuts 62. Regulator 55 is adapted for connection to a propane bottle or tank (not shown).

FIG. 4 shows the invention in packed configuration for transportation. (The barbecue heat shield 32 is also illustrated in its operating position beneath the barbecue unit). When packed, the barbecue grate 19 is removed and the camp stove grate 40 is placed over the smoker plate 22, which remains in its usual operating position. A specially fitted griddle 60 which can be used for cooking on the camp stove may also be provided to sit on the stove grate 40. The barbecue grate 19 is then placed over the griddle and the heat shield 32 then sits on the barbecue grate 19. Lid 3 with burners 44 is then inverted over the assembly and latch 9 is closed shut.

To operate the stove and barbecue, latch 9 is unlatched and lid 3 is opened (see FIG. 2) until burners 44 face upwards. Heat shield 32 is removed from the case and inverted so that exposed ends of screws 35 extend upwardly. The heat shield 32 is placed under lower section 5 s that screws 35 fit in the holes provided in the underside of the section 5. In this position, shown in FIG. 3, both the stove and barbecue sections 3 and 5 sit flat on the supporting surface. The heat shield 32 allows the barbecue section 5 to sit in close proximity to the supporting surface without danger of scorching the surface.

The barbecue and stove grates 19 and 40 are next removed from the case and replaced in their respective operating positions, with the handles of the barbecue grate 19 extending upwardly. The stove grate 40 is inverted on the stove section 3 with its legs extending downwardly to sit in provided support grooves and the wind screens 42 will generally be placed in a downwardly extending position. The smoker plate 22 remains in position above the burner in the barbecue section 5. The barbecue regulator 30 is screwed into position on inlet 17 and the stove connections are tightened into inlet 15. The hoses 31 and 54 are connected to the propane source and the stove and barbecue are ready for lighting. A hole is provided in the side of lower section 5 for lighting the barbecue. When cooking is completed the process is reversed to re-pack the assembly.

Figure 3:
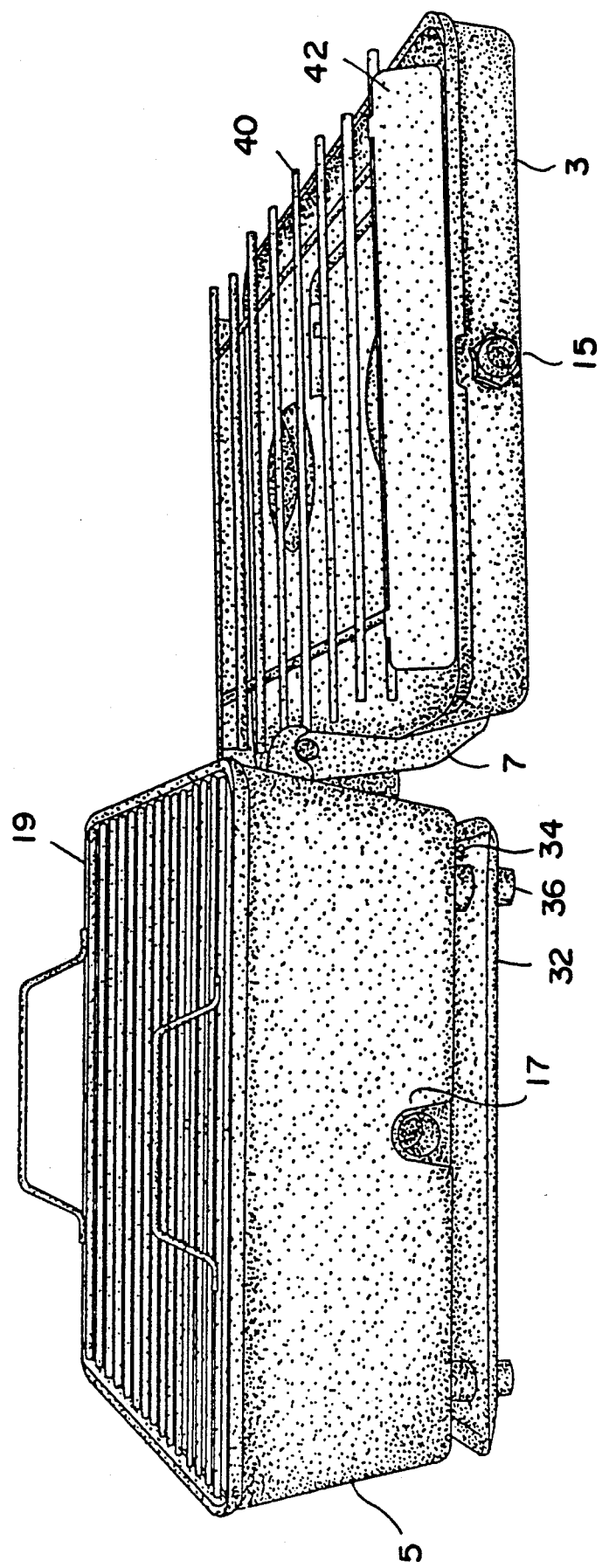
FIG. 3 is a perspective view of the invention shown in FIG. 1 in cooking position with the hinges engaged.

The design of heat shield 32 is advantageous in that it allows the unit to sit low enough on a table to be at a convenient cooking height and also allows the camp-stove section to sit unsupported and remain hinged to the barbecue section while in use, as shown in FIG. 3. This is accomplished without sacrificing the slim profile of the unit due to the nestability of the heat shield within the case of the unit when being transported. Previous portable barbecues have required unwieldy, long folding legs to provide sufficient distance from the supporting surface to prevent overheating of the supporting surface. The heat shield can also serve to catch grease from the unit.

Figure 7:
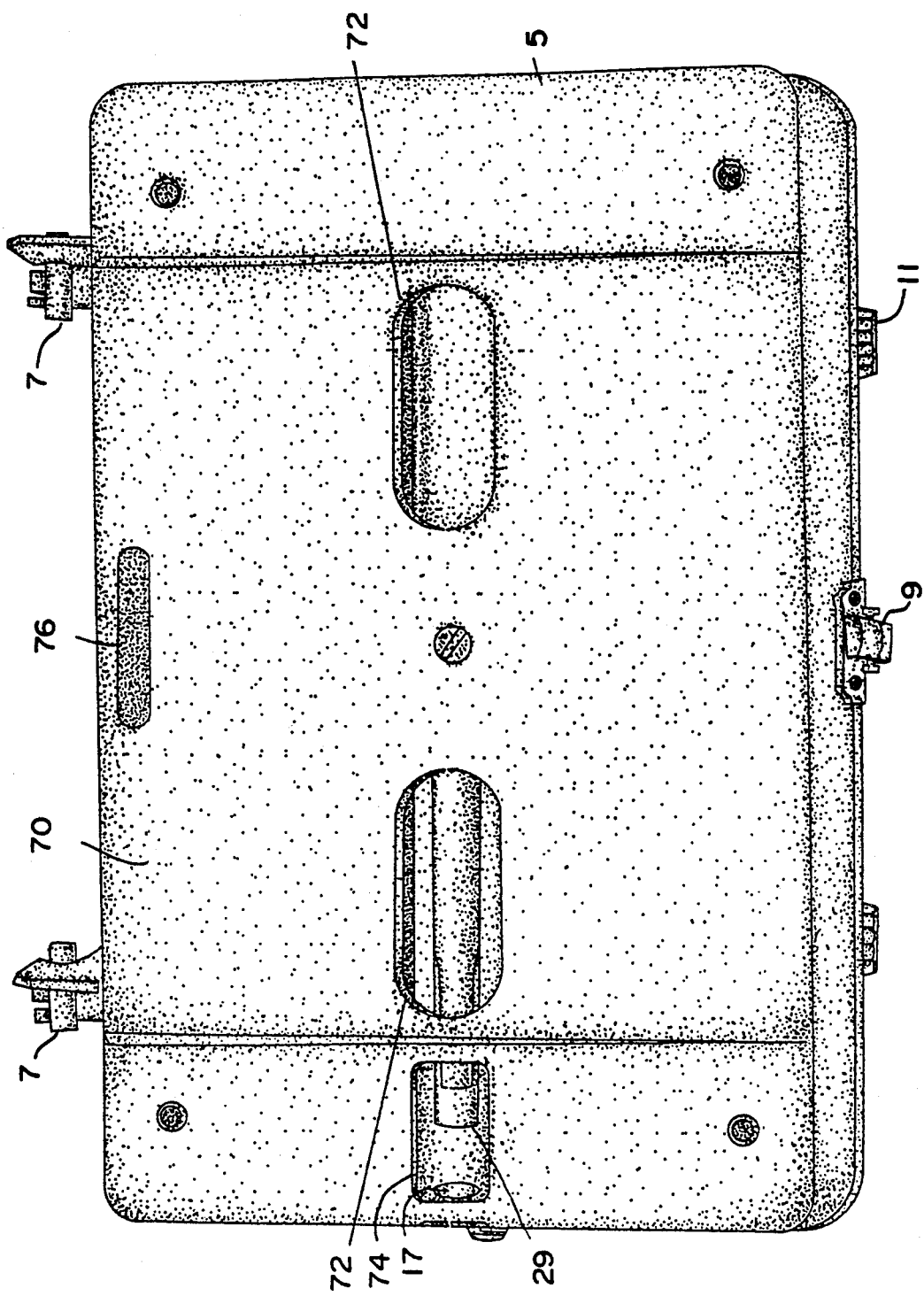
FIG. 7 is a bottom view of the invention in closed configuration.
Figure 8:
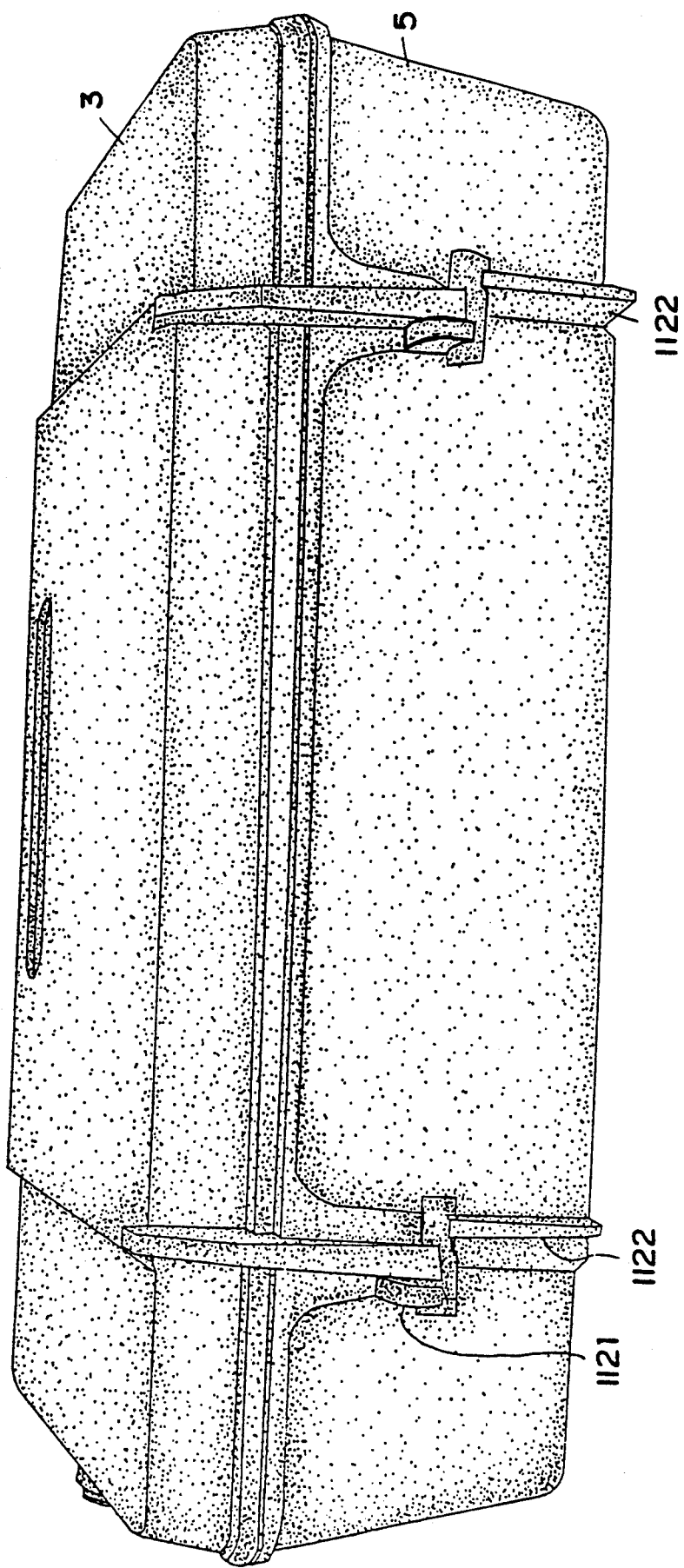
FIG. 8 is a rear perspective view of the invention shown in FIG. 1.
Figure 9:
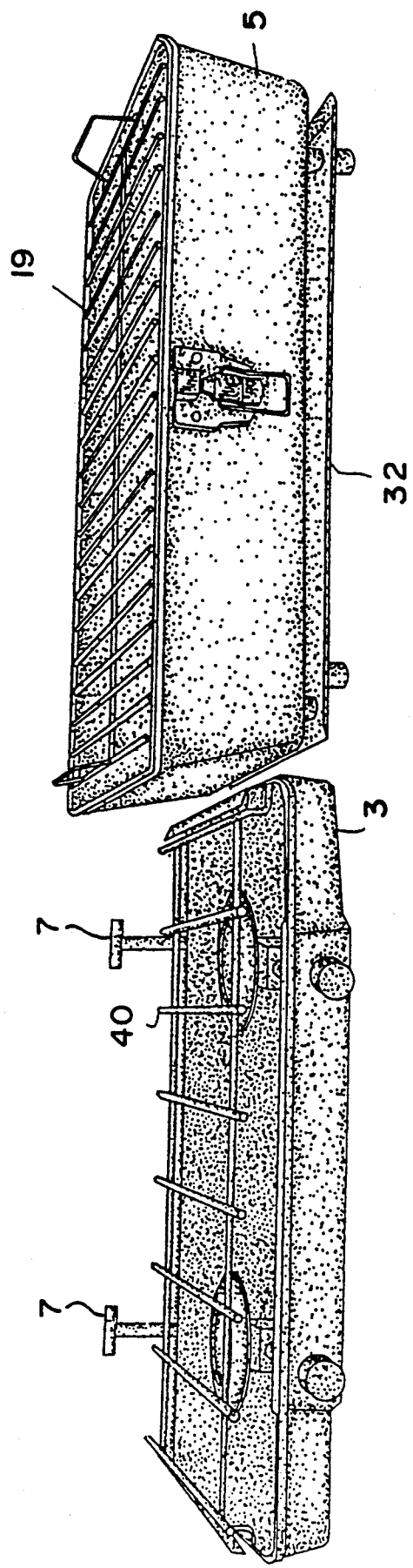
FIG. 9 is a perspective view of the invention shown in FIG. 1 in cooking position with the hinges disengaged.

Heat shield 32 is preferably formed of a heat-reflecting metal such as aluminum in order to serve a heat reflective function. It also acts as a baffle to direct cooling air under the unit and to prevent the buildup of warm air between the unit and the supporting surface. Looking at FIG. 7, the bottom surface 70 of the unit is provided with two air intakes 72 which are elongated holes provided in the casing and open into the interior of the barbecue unit. A further elongated hole 74 is provided in the bottom surface 70 to supply air directly to the propane burner tube 29 to be mixed with the incoming propane. A further slot 76 in the bottom surface 70 is a grease drain required by regulation. The size, shape and location of air intakes 72 in relation to the heat shield, and the separation of the heat shield from the bottom surface 70 and from the supporting surface, is such that cool air flows over the upper and lower surfaces of heat shield 32 to cool it and increase its effectiveness in maintaining the supporting surface at a cool temperature.

Thus, the drawing of air for purposes of combustion, as well as the rising of heated air over the unit, causes air to be drawn up through air intakes 72 from the area above heat shield 32 and below bottom surface 70. This air is replaced by cool air drawn across the upper heat shield surface from outside the edges of the heat shield 32. The open area of air intakes 72 and the vertical spacing between neat shield 32 and bottom surface 70 are selected to provide the proper flow rate of combustion air to the barbecue burner 26, and therefore are related to the capacity of the latter. The open intake area and the heat shield spacing also area interrelated because the spacing is small enough to restrict ambient air flow into air intakes 72. Thus, an increase in the vertical spacing between neat shield 32 and bottom surface 70 may require a decrease in the open intake area, and vice versa.

The replacement air drawn across the upper surface of the heat shield includes air currents rising around the edges thereof such that a flow of air also is provided under the heat shield. These air flows maintain the heat shield at a cool temperature and also reduce the warming of air under the heat shield. The bottom wall of the barbecue section is also cooled by the replacement air flow. As a result, while the actual temperature of the supporting surface during use of the barbecue section will depend on the ambient conditions, such as air temperature, wind, etc., a typical operation of the barbecue section in conjunction with the heat shield will cause the temperature of the supporting surface to be raised only a few degrees, such as by 4 to 6 degrees Fahrenheit.

The respective lengths of heat shield legs 34 and 36 need not be the same, but may be different in order to maintain grate 19 level where the walls of barbecue section 5 extend to different heights (not shown). For example, front upper legs 34 and/or front lower legs 36 may be longer than rear upper legs 34 and rear lower legs 36 if the height of the front wall of the barbecue section is less than that of its rear wall. However, changes in the vertical distance between different portions of heat shield 32 and bottom surface 70 may necessitate changing the size of air intakes 72 to provide the proper flow of combustion air as indicated above.

Figure 10:
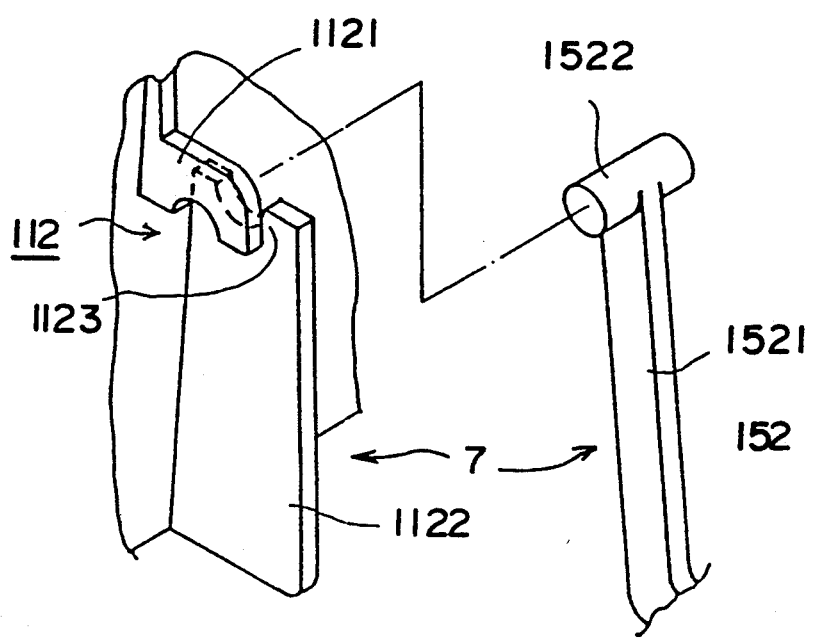
FIG. 10 is a detail view showing the hinges of the invention.

FIG. 10 illustrates in further detail the preferred structure of hinges 7. Each hinge 7 consists of an upstanding arm 152 attached to the stove half 3 and a corresponding set 112 of notched flanges attached to the rear wall of barbecue section 5. Arm 152 consists of a cylindrical end 1522 mounted in T-shaped fashion on the end of an arm portion 1521. Each set 112 of flanges consists of two offset flanges 1121 and 1122, each of which has a rounded notch 1123 to receive the cylindrical end 1522 and permit it to rotate therein. The two hinges 7 have the same structure such that each cylindrical end 1522 is inserted in its corresponding pair of notches 1123 from right to left or removed therefrom from left to right as illustrated by the broken line in FIG. 10.

As will be apparent to those skilled in the art, various modifications and adaptations of the structure above described may be made without departing from the spirit or the invention, the scope of which is to be construed in accordance with the accompanying claims.

We claim:

1. A portable combination camp stove and barbecue adapted for use on a supporting surface, comprising:
   a) a first housing having a top wall and four side walls forming an open bottom and provided with a gas stove burner element;
   b) a second housing having a bottom wall and four side walls forming an open top and provided with a gas barbecue burner element and adapted for hingedly co-operating with said first housing to form the casing of a unit able to be hingedly opened and closed;
   c) fuel supply means for providing a supply of fuel to said stove and barbecue burner elements;
   d) regulator means for controlling the supply of fuel to said stove and barbecue burner elements;
   e) a first grate adapted for sitting above said barbecue burner element in said second housing;
   f) a heating transferring plate adapted for removable mounting in said second housing between said first grate and said barbecue burner element and having an extended upwardly-facing surface;
   g) means for supporting said heat transferring plate above said barbecue burner element;
   h) means for supporting said first grate above said barbecue burner element;
   i) a second grate adapted for sitting above said stove burner element;
   j) means for supporting said second grate above said stove burner element; and
   k) heat shielding means having an upper surface and a lower surface and adapted to be positioned between said bottom wall of said second housing and said supporting surface, said heat shielding means comprising upper and lower heat insulating spacer means adapted to bear respectively against the upper and lower surfaces thereof for supporting said second housing above said supporting surface; wherein said second housing is adapted to be supported by said upper heat insulating spacer means above and spaced from the upper surface of said heat shielding means, wherein said heat shielding means is adapted to be supported by said lower heat insulating spacer means such that the lower surface thereof is above and spaced from said supporting surface, wherein said first and second grates, said heat shielding means and said heat transferring plates are adapted to fit within said first and second housings when closed, wherein said heat shielding means comprises a planar sheet of heat shielding material extending over an area comparable to the area of said bottom wall, wherein said bottom wall is provided with one or more apertures adapted to permit the passage of air to the interior of said second housing from an area between said bottom wall and said heat shielding means when said barbecue burner element is in operation and said heat shielding means is in position between said bottom wall and said supporting surface.

2. The portable camp stove and barbecue of claim 1 further comprising latching means for securing said first housing to said second housing.

3. The portable camp stove and barbecue of claim 2 further comprising hinge means for hingedly connecting said first and second housings.

4. The portable camp stove and barbecue of claim 3 wherein said hinge means is adapted so that said top wall of said first housing and said heat shielding means, when said housings are in an open position, are supported on a common plane.

5. The portable camp stove and barbecue of claim 1 wherein said lower heat insulating spacer means comprises at least three supporting legs secured to said lower surface.

6. The portable camp stove and barbecue of claim 5 wherein said upper heat insulating spacer means comprises at least three upper supporting legs secured to said upper surface.

7. The portable camp stove and barbecue of claim 6 wherein said bottom wall comprises a plurality of support apertures in the lower surface thereof and each of said upper supporting legs comprises elongated means extending upwardly for mating with a corresponding one of said support apertures in said bottom wall.

8. The portable camp stove and barbecue of claim 1 wherein said first housing is provided with handle means.

9. The portable camp stove and barbecue of claim 1 wherein said second housing is provided with handle means.

10. The portable camp stove and barbecue of claim 1 wherein said first housing includes two gas stove burner elements.

11. The portable combination campstove and barbecue of claim 1 wherein said upper heat insulating spacer means comprises a plurality of supporting legs secured to said upper surface for supporting said second housing above said heat shielding means.

12. The portable camp stove and barbecue of claim 1 wherein the size of said one or more apertures in said bottom wall, the spacing of said upper surface from said bottom wall and the spacing of said lower surface from said supporting surface are such that operation of said barbecue burner element causes the upper and lower surfaces of said heat shield means to be cooled by a flow of ambient air drawn across said upper surface and through said one or more apertures.

13. A portable communication camp stove and barbecue grill adapted for use on a supporting surface, comprising:

a first housing having a top wall and four side walls forming an open first chamber and provided with at least one gas stove burner element in said first chamber;

a first grate adapted for sitting above said stove burner element;

means for supporting said first grate above said stove burner element;

a second housing having a bottom wall and four side walls forming an open second chamber and provided with at least one gas barbecue burner element in said second chamber, said second housing being adapted for hingedly co-operating with said first housing to form a portable casing of a combination unit able to be hingedly opened and closed;

fuel supply means for providing a supply of fuel to said stove and barbecue burner elements;

a second grate adapted for sitting above said barbecue burner element in said second housing;

a heat transferring plate adapted for removable mounting in said second housing between said second grate and said barbecue burner element and having an extended upwardly-facing surface;

means for supporting said heat transferring plate above said barbecue burner elements;

means for supporting said second grate above said barbecue burner element; and, heat shielding means comprising a planar heat shield member adapted to be positioned between said bottom wall of said second housing and said supporting surface, and a plurality of upper and lower heat insulating spacer means adapted to bear respectively against an upper surface and a lower surface of the heat shield member for supporting said second housing above said supporting surface;

said second housing being adapted to be supported by said upper heat insulating spacer means above and spaced from said heat shield member, said heat shield member being adapted to be supported by said lower heat insulating spacer means above and spaced from said supporting surface, said first and second grates, said heat shielding means and said heat transferring plate being adapted to fit within said first and second housings when closed, said heat shield member extending over an area comparable to the area of said bottom wall of said second housing, and said bottom wall being provided with at least one air inlet aperture adapted to permit the passage of air into the interior of said second housing from an area between said bottom wall and said heat shield member when said barbecue burner element is in operation and said heat shield member is in position between said bottom wall and said supporting surface, such that operation of said barbecue burner element causes said heat shield member to be cooled by a flow of ambient air drawn across said heat shield member and through said at least one air inlet aperture.

14. The portable camp stove and barbecue of claim 13 wherein said upper heat insulating spacer means comprises a plurality of supporting legs secured to said upper surface.

15. The portable camp stove and barbecue of claim 14 wherein said lower heat insulating spacer means comprises a plurality of lower supporting legs secured to said lower surface.

16. The portable camp stove and barbecue of claim 14 wherein said bottom wall comprises a plurality of support apertures in the lower surface thereof and each of said supporting legs comprises elongated means extending upwardly for mating with a corresponding one of said support apertures in said bottom wall.

17. A portable cooking apparatus adapted for use on a supporting surface, comprising:
 a) a housing having a bottom wall and four sidewalls forming an open top and provided with a gas burner element;
 b) fuel supply means for providing a supply of fuel to said burner elements;
 c) regulator means for controlling the supply of fuel to said burner element;
 d) heat shielding means adapted to be positioned between said bottom wall of said housing and said supporting surface for reducing the transfer of heat from said housing to said supporting surface, said heat shielding means comprising an upper and a lower surface, and upper and lower heat insulating spacer means adapted to bear respectively against said upper and lower surfaces thereof for supporting said housing and said heat shielding means above said supporting surfaces;
 wherein said housing is adapted to be supported by said upper heat insulating spacer means above and spaced from the upper surface of said heat shielding means, wherein said heat shielding means is adapted to be supported by said lower heat insulating spacer means such that the lower surface thereof is above and spaced from said supporting surface, wherein said heat shielding means comprises a planar sheet of heat shielding material spaced from said bottom wall and extending over an area comparable to the area thereof, and wherein said bottom wall is provided with one or more apertures adapted to permit the passage of air to the interior of said housing from an area between said bottom wall and said heat shielding means when said burner element is in operation and said heat shielding means is in position between said bottom wall and said supporting surface, the size of said one or more apertures in said bottom wall and the spacing of said planar sheet from said bottom wall being selected to maximize the heat shielding effect of said heat shielding means under normal operating conditions.

18. The portable camp stove and barbecue of claim 17 wherein said lower heat insulating spacer means comprises at least three supporting legs secured to said lower surface.

19. The portable camp stove and barbecue of claim 18 wherein said upper heat insulating spacer means comprises at least three upper supporting legs secured to said upper surface.

20. The portable camp stove and barbecue of claim 19 wherein said bottom wall comprises a plurality of support apertures in the lower surface thereof and each of said upper supporting legs comprises elongated means extending upwardly for mating with a corresponding one of said support apertures in said bottom wall.

* * * * *

UNITED STATES PATENT AND TRADEMARK OFFICE
CERTIFICATE OF CORRECTION

PATENT NO. : 5,313,928
DATED : May 24, 1994
INVENTOR(S) : AUBREY RODGERS et al.

It is certified that error appears in the above-identified patent and that said Letters Patent is hereby corrected as shown below:

On the title page, item (63), line 2, "which is" should read --and--.

Column 5, line 44, change "heating" to --heat--.
Column 6, line 5, change "plates" to --plate--; and line 66, change "communication" to --combination--.
Column 7, line 25, change "elements" to --element--.
Column 8, line 15, change "elements" to --element--.

Signed and Sealed this

Twentieth Day of September, 1994

Attest:

BRUCE LEHMAN

Attesting Officer

Commissioner of Patents and Trademarks